Jan. 28, 1964 W. S. BARTKY 3,119,267
CAPACITANCE MEASURING APPARATUS
Filed Jan. 16, 1961 3 Sheets-Sheet 1
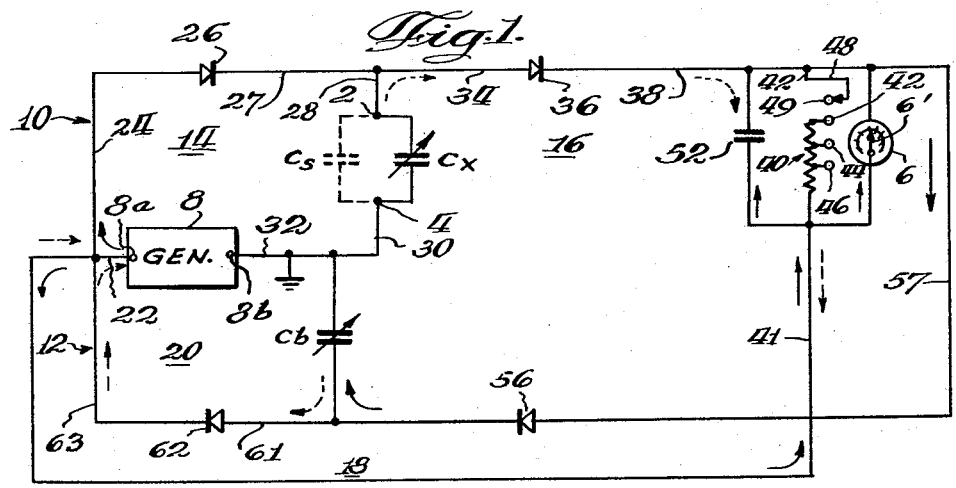
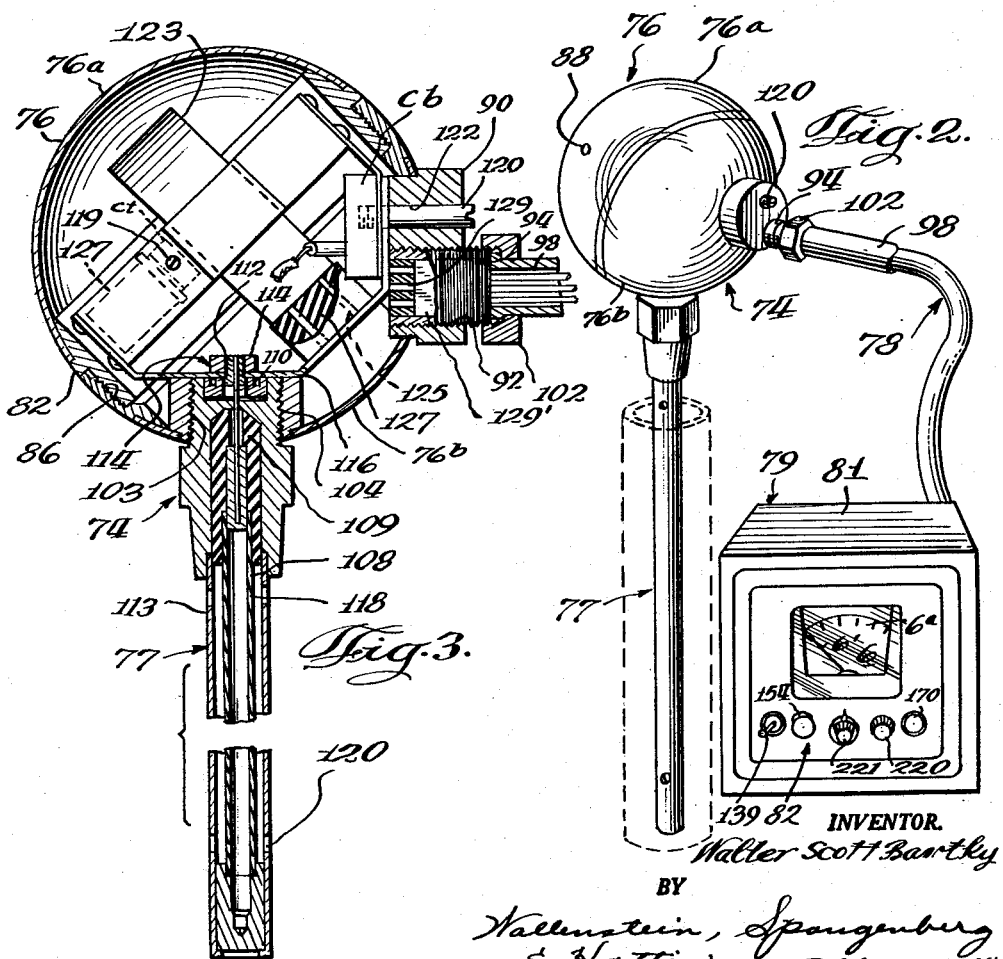
INVENTOR.
Walter Scott Bartky
BY
Wallenstein, Spangenburg
& Hattis
Attorneys

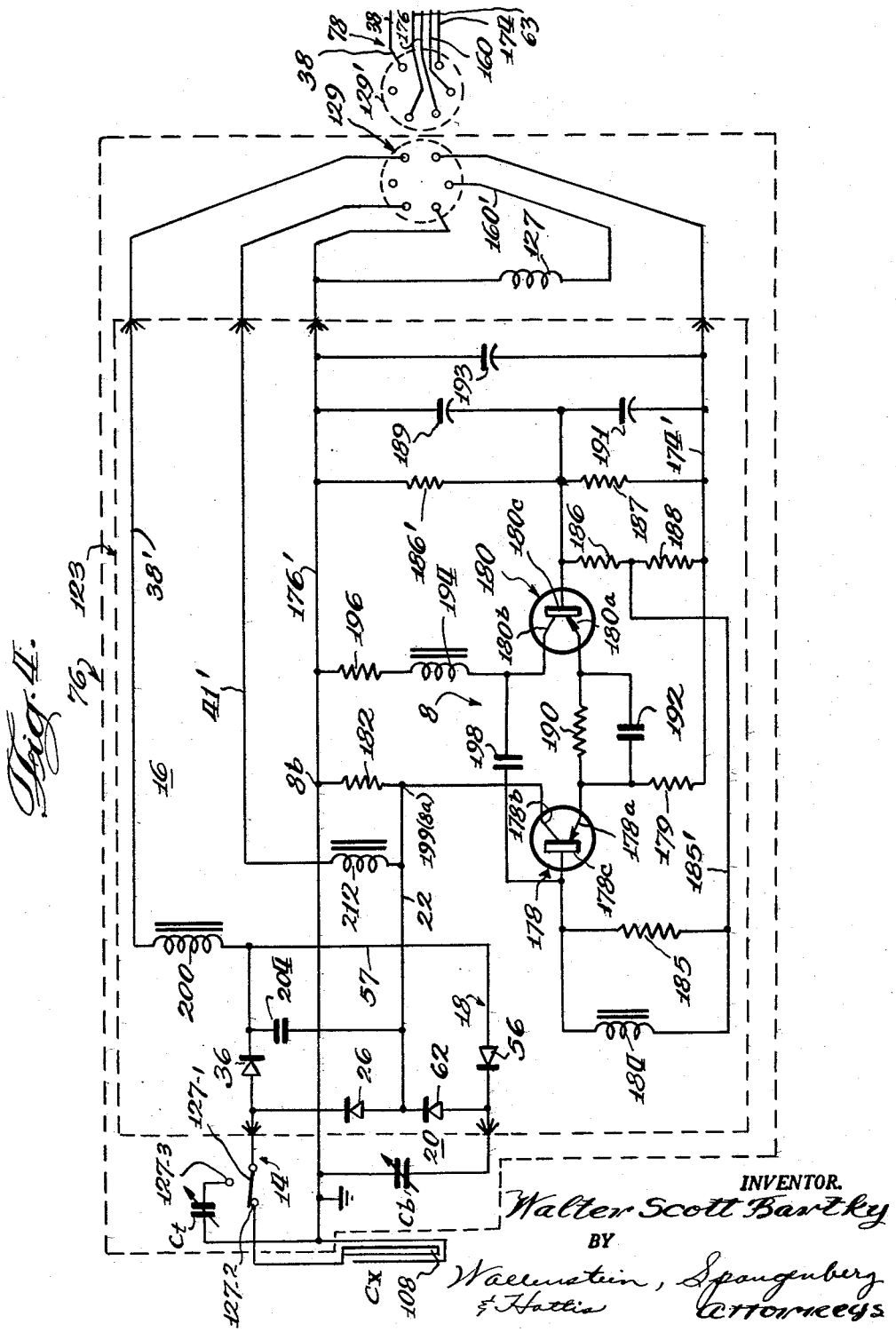

INVENTOR.
Walter Scott Bartky

United States Patent Office 3,119,267
Patented Jan. 28, 1964

3,119,267
CAPACITANCE MEASURING APPARATUS
Walter Scott Bartky, Champaign, Ill., assignor, by mesne assignments, to General Controls Co., a corporation of California
Filed Jan. 16, 1961, Ser. No. 82,835
13 Claims. (Cl. 73—304)

This invention relates to capacitance measuring apparatus and the like, and particularly to capacitance measuring appartus for measuring very small capacitance values. The present invention has particular utility in liquid level indicators using capacitance probes immersed in the liquid whose level is to be indicated, where the capacitance of the probe is a function of the degree to which the probe is submerged in the liquid. This application is an improvement over the specific Capacitance Measuring Apparatus disclosed in copending application Serial No. 29,900, filed May 18, 1960.

The capacitance measuring systems heretofore developed for the most part are inherently non-linear devices operating, for example, on a Wheatstone bridge balancing principle or on a principle involving direct measurement of the A.C. reactance of the capacitance involved. Also, to obtain useable levels of sensitivity, these systems require direct current amplifiers which create problems because of their instability caused by drift and other factors. Moreover, the accuracy of these systems when measuring small changes of capacity value in the presence of relatively large static capacitances has left much to be desired.

It is an object of the present invention to provide improved capacitance measuring apparatus capable of measuring with great accuracy capacitances of very low values, as, for example, capacitances of the order of tenths of a micromicrofarad and with equipment of relatively simple, rugged and reliable construction. A related object of the present invention is to provide capacitance measuring apparatus as just described, which does not require the use of amplifiers. This avoids the problem of instability caused by drift and other factors, a problem commonly present with sensitive measuring equipment using amplifiers, particularly direct current amplifiers.

Another object of the invention is to provide improved capacitance measuring apparatus for measuring very small changes in capacitance in the presence of a relatively large static capacitance. A related object to the invention is to provide capacitance measuring apparatus as just described which is inherently linear in response.

In the capacitance measuring apparatus of said copending application, among other things, a capacitor balancing circuit is combined with a measuring circuit operating on a capacitor charge principle to enable the measurement of small capacity changes in the presence of large static capacity values. This principle is also used in the present invention. In the exemplary circuit disclosed in this copending application, the capacitance to be measured and a variable balancing capacitor are symmetrically arranged in separate charge circuits fed from a common source of pulses of a given polarity and, in the interval between these pulses, the capacitors discharge simultaneously in opposite directions through a symmetrical load circuit including a pair of variable range changing resistors having outer ends connected to the respective discharge lines extending to the capacitors, and inner ends connected to a common return line. Respective filter capacitors are connected across the range changing resistors and average voltages are developed across these capacitors proportional to the values of the capacitors being discharged. Also, a direct current meter movement is connected across the outer ends of the range changing resistors to respond to the resultant of the voltage drops thereacross. Rectifiers are placed in the respective discharge paths of the capacitors to block current flow in the direction opposite to the direction of flow of the discharge current. Initially, with only static capacitance present, the balancing capacitor is adjusted so that the voltage drops across the variable range changing resistors are equal and of opposite polarity as indicated by a zero reading on the direct current meter movement. Any subsequent increase in the capacitance of the circuit including the capacitance to be measured will result in an increase in the discharge current of the associated discharge circuit and an unbalance of the voltage drops across the range changing resistors resulting in a proportional flow of current through the direct current meter movement.

The sensitivity and linearity of this measuring circuit depend upon the substantially complete discharging of the unknown and balancing capacitors. In the circuit described, however, the unknown and balancing capacitors can discharge only as long as the aforementioned rectifiers are conductive, and the average voltages developed across the filter capacitors in shunt with the range changing resistors act as back potentials preventing conduction of the respective rectifiers whenever the voltages across the discharging capacitors drop below these back potentials. This problem becomes significant when the discharging capacitors are quite large. For moderate and low discharging capacitance values, the back potentials built up across the filter capacitors are an insignificant fraction of the voltages to which the discharging capacitors are charged.

With the circuit just described, it should be further noted that there is a practical limit to the value of the range changing resistors since they operate as the main return path for current flow to the common load return line. Aside from the question of linearity, therefore, this circiut presents certain limitations on the attainable sensitivity of the circuit since this sensitivity is determined in part by the size of the direct current impedances shunting the direct current meter movement. Obviously, the greater this impedance the greater is the current which flows through the meter.

Accordingly, it is another object of the present invention to provide a circuit of the general type disclosed in said copending application which overcomes the aforesaid limitations of the exemplary circuit disclosed therein.

In accordance with the broader aspects of the present invention, substantially increased sensitivity is obtained without the non-linearity problems referred to by the unexpectedly simple expedient of utilizing an asymmetrical rather than a symmetrical arrangement of charge and discharge circuits. The load circuit comprises a simple parallel circuit of a direct current meter movement, range changing resistance means and capacitor means. The discharge circuits of one of the capacitors is fed in one direction through this load circuit as before. However, the charge rather than the discharge circuit of the other capacitor is fed in the opposite direction through the load circuit so that a balancing of the charge and discharge currents of the unknown and balancing capacitor circuits will result in a substantially zero voltage across the filter capacitor means in the load circuit so that substantially no back potential is provided for preventing the full charge or discharge of the circuits involved. Moreover, the range changing resistance means does not constitute the main return path for current flow but acts only as a shunting impedance for the direct current meter movement which is now the main return path for current flow. The range changing resistance means may therefore be as large as desired for the most sensitive range of operation of the system.

Refer now to the drawings wherein:

FIG. 1 is a schematic diagram of a form of the present invention usable as a simple capacitance measuring circuit;

FIG. 2 shows the physical components of a liquid level indicator incorporating the present invention;

FIG. 3 is an enlarged vertical sectional view through the capacitance probe head forming one of the components shown in FIG. 2;

FIG. 4 is a schematic diagram of the electrical circuitry of the capacitance probe head shown in FIGS. 2 and 3.

Figure 5:
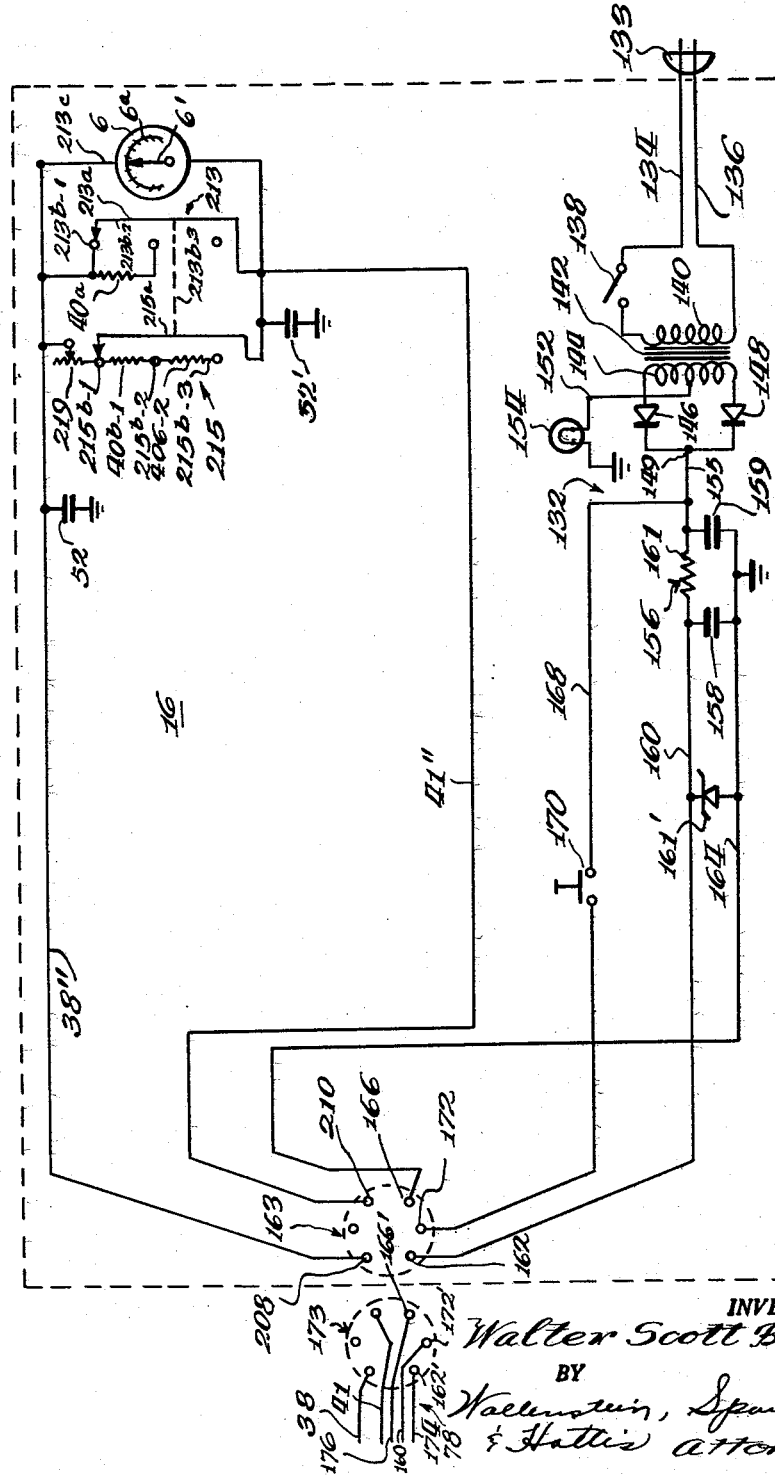
FIG. 5 is a circuit diagram of the electrical circuitry contained within the meter housing forming another one of the components shown in FIG. 2.

Referring now to FIG. 1 which shows a simplified schematic of one form of the present invention, the capacitance measuring circuit there shown includes a pair of input terminals 2 and 4 to which an unknown capacitor to be measured is connected. A sensitive direct current meter movement 6 is used to indicate the capacitance value measured. Various branch circuits to be described interconnect the terminals 2 and 4 and the meter movement 6 to effect the deflection of the pointer 6' of the meter movement in direct proportion to the value of the capacitance to be measured. A source of power for operating the direct current meter is provided in the form of a pulse generator 8. The pulse generator is preferably made of solid state components, such as transistors, used as on-off switching devices for providing a continuous train of voltage pulses of a given polarity. These voltage pulses are developed between the signal output terminal 8a and a reference or ground terminal 8b.

The pulse generator is connected to a measuring circuit 10 in which the unknown capacitance ($Cx$) forms an element, and a balancing circuit 12 in which a variable balancing capacitor $Cb$ forms an element. The measuring circuit 10 includes a capacitor charge circuit 14 and a capacitor discharge circuit 16. The balancing circuit 12 includes a charge circuit 18 and a discharge circuit 20. It can be shown that the average values of the currents flowing in the charge or discharge section of the measuring and balancing circuits 10 and 12 bear a linear relationship to the values of the capacitances in these two circuits. This linear relationship is due basically to the fact that the charge Q stored in a capacitor of value C as a result of a voltage V is a linear relationship expressed by the formula $Q = CV$. The meter movement 6 is differentially connected to the measuring circuit 10 and the balancing circuit 12 so that the currents flowing in these circuits have opposite effects on the meter movement 6. The capacitance of the balancing circuit 12 is initially adjusted with the unknown capacitance $Cx$ disconnected from the measuring circuit 10 so that no current flows through the meter movement 6. This cancels out any effect of static and stray capacitance ($Cs$) on the meter reading. Then, upon subsequent connection of capacitance $Cx$ into the measuring circuit, the position of the meter pointer 6' will indicate the value of unknown capacitance $Cx$.

As previously indicated, in accordance with the present invention, one of the charge circuits 14 or 18 is coupled to the direct current meter movement 6 and the discharge circuit 20 or 16 associated with the charge circuit, which is not coupled to the meter movement, is coupled to the meter movement so that the discharge current involved flows through the meter movement in a direction opposite to that in which the charge current flows therethrough. The meter movement or load circuit is, in effect, positioned in a path portion which is in common with the charge and discharge circuits involved. When the balancing capacitor $Cb$ is initially adjusted so that the charge and discharge currents flowing through the meter movement balance one another in the presence of only static capacitance, the subsequent deflection of the meter movement will be a linear measure of the unknown capacitance involved. In the most preferred form of the invention, the charge circuit 18 associated with the balancing capacitors $Cb$ and the discharge circuit 16 associated with the unknown capacitance $Cx$ are coupled to the meter movement 6.

In FIG. 1, the charge circuit 14 for the unknown capacitance $Cx$ includes a common conductor 22 extending from a positive pulse output terminal 8a of a pulse generator 8, a conductor 24 extending to a suitable rectifier 26 polarized to pass only pulses of a desired polarity which, for illustrative purposes, will be considered positive. The rectifier 26 is connected by conductors 27 and 28 to the upper input terminal 2 to which one end of unknown capacitance $Cx$ is connected. A conductor 30 extending from the other input terminal 4 is connected by a grounded conductor 32 to the terminal 8b of the pulse generator 8. The time constant of the capacitor charge circuit 14 is such that the largest capacitance $Cs$ plus $Cx$ to be measured is fully charged within the duration of each of the pulses coupled thereto through the rectifier 26. The charge stored on the capacitance $Cs$ plus $Cx$ is proportional both to the amplitude of the voltage pulses of pulse generator 8 and the sum of the capacitances $Cs$ and $Cx$ involved.

The static capacitance $Cs$ represents distributed capacitance in the circuit involved as well as any fixed or initial capacitance in the device or circuit which is connected across the input terminals 2 and 4. Thus, when the present invention is used in a liquid level indicator where a liquid immersed capacitance probe is connected across input terminals 2 and 4, the static capacitance $Cs$ would include the probe capacitance when the liquid level is at or below the bottom of the probe. If the liquid involved has a dielectric constant greater than one, it is apparent that the overall capacitance of the probe will increase in proportion to the length of the probe submerged in the liquid. This application of the invention will be described in more detail in connection with the embodiment illustrated in FIGS. 2 through 5.

A rectifier 36 polarized to pass current flow from the positive voltage developed across the unknown capacitance $Cx$ is connected by a conductor 34 to the juncture of conductors 27 and 28. A conductor 38 connects the rectifier 36 to the upper and of the meter movement 6 forming part of the load circuit. The conductor 38 also connects with one end of a range changing resistance unit 40 which is illustrated as a variable resistor including tap-off terminals 42, 44 and 46 and a movable contact or wiper 48 adapted to make selective connection with the tap-off terminals. The wiper or movable contact 48 is also engageable with a free terminal 49 which provides an open circuit which disconnects the variable resistor from the circuit for maximum sensitivity. The bottom end of the range changing resistor is connected to a conductor 41 leading to conductor 22 in turn connected to the terminal 8a of the pulse generator 8 which has no useful voltage output during discharge of the unknown capacitance $Cx$ and acts merely as a return path for the discharge current flowing into the bottom unknown capacitance terminal 4. A capacitor 52 is connected between conductors 38 and 41 in parallel with the range changing resistance unit 40 and acts as a filter condenser which provides a low A.C. impedance for charge and discharge currents flowing through the load circuit.

The capacitor charge circuit 18 associated with the balancing capacitor $Cb$ includes the aforementioned conductor 41 coupled to the output terminal 8a of the pulse generator 8, the load circuit including the direct current meter movement 6 in parallel with the range changing resistance unit 40 and the capacitor 52, and conductor 57 connected to the upper end of the load circuit and extending to a rectifier 56 polarized to pass only positive pulses and connected to the bottom terminal of the balancing capacitor $Cb$. The charge circuit is completed by connection of the other end of the balancing capacitor $Cb$ to the common conductor 32 extending to the grounded terminal $8b$ of the pulse generator 8.

The capacitor discharge circuit 20 associated with the balancing capacitor $Cb$ includes a conductor 61 extending from the bottom terminal of the balancing capacitor $Cb$, a rectifier 62 polarized to pass the current resulting from the positive voltage built up across the capacitor $Cb$, and a conductor 63 leading to the output terminal $8a$ of the pulse generator 8.

The time constants of the charge circuits 14 and 18 are such that the associated capacitors $Cx$ and $Cb$ will fully charge in the duration of the positive pulses involved. Similarly, the time constants of the discharge circuits 16 and 20 associated with these capacitors are such that they will substantially fully discharge in the interim between successive pulses. The effective value of the discharge current flowing in the discharge circuit 16 through the meter movement is proportional to the value of the sum of the capacitance $Cx$ and $Cs$. By adjusting the value of the balancing $Cb$, the effective value of the current flowing in the charge circuit 18 through the meter movement 6 can be made to balance out the effect of the discharge current resulting from the static capacitance $Cs$ with the capacitance represented by $Cx$ disconnected from the circuit. In such case, the value of the voltage developed across the filter capacitor 52 is substantially zero. Any additional incremental current flowing in the discharge circuit 16 due to the presence of the unknown capacitance $Cx$ is then registered on the direct current meter movement 6 and is proportional to the value of $Cx$.

The sensitivity of the measuring circuit is affected by any shunting impedance across the meter movement. When the movable contact or wiper 48 is on the free contact 49, the direct current impedance across the meter movement is infinity. In such case, all of the aforesaid incremental direct current flow in the load circuit passes through the meter movement and the full scale deflection of the meter movement represents a relatively small capacitance. When the movable contact or wiper 48 is moved into contact successively with the tap-off points 42 and 44 and 46 of the range changing resistor, the sensitivity of the measuring circuit decreases so that full scale deflections of the meter movement represents a progressively increasing capacitance.

Refer now to FIGS. 2 through 5 which show in detail a most preferred embodiment of the form of the invention shown in FIG. 1 as applied to liquid level measuring apparatus. In this application of the invention, the basic components of the apparatus comprise a capacity probe head unit 74 including a generally spherically shaped housing 76 from which depends a capacitance probe 77, a meter and control unit 79 and a cable 78 interconnecting the capacity probe head unit 74 and the meter and control unit 79. The probe head housing 76 contains most of the components schematically illustrated in FIG. 1 except for the range changing resistance 40 and the meter movement 6. The meter and control unit 79 comprises a housing or casing 81 containing the range changing resistance and the meter movement, the latter having a scale $6a$ which is visible through a window in the housing 81. The housing 81 additionally has a number of control knobs generally indicated by reference number 82 which will be described in more detail hereinafter.

Referring now to FIG. 3, the spherical probe head housing 76 is made of a pair of hollow hemispherical housing parts $76a$ and $76b$. The housing part $76a$ has an externally threaded neck portion 82 at its inner or wide end which threads into an internally threaded portion 86 at the inner or wide end of the housing part $76b$. The two housing parts $76a$ and $76b$ may be tightly threaded together by hand or by use of a spanner wrench insertable through one or more holes 88 (FIG. 2) in the housing part $76a$.

The housing part $76b$ has an outwardly extending neck portion 90 which extends in a direction approximately 45° of the plane of juncture between the housing parts $76a$ and $76b$. The neck portion 90 has an internally threaded opening 92 into which is threaded a cable-receiving sleeve 94. A horizontal conduit section 98 is provided with a nut 102 adapted to thread over the sleeve 94 fixedly to secure the probe head housing 76 upon the conduit 98, which may be anchored in a horizontal position in any suitable manner.

The housing part $76b$ has an internally threaded socket 103 in the bottom thereof which receives the capacitance probe 77. The capacitance probe 77 has an externally threaded metal connector 104 at its upper end which threadedly fits into the socket 103. The capacitance probe has a central metallic rod 108 embedded in its upper end in a sleeve 109 of insulating material and terminating at its upper end in a terminal pin 110 which extends into a terminal socket 112 formed in a terminal member 114 supported upon a bracket 116 mounted within the housing 76. Sandwiched between the insulating sleeve 109 and the metal connector 104 is an outer metal sleeve 113 which constitutes an outer plate of a capacitor, the inner plate of which is formed by the metal rod 108. The sleeve 113 has openings 118—120 at its upper and lower ends through which the fluid to be measured may pass into the space between the sleeve 113 and the rod 108. The capacitance between the sleeve 113 and the rod 108 will vary in a linear manner with the level of the liquid therebetween.

The housing part $76b$ carries the aforementioned balancing capacitor $Cb$. The balancing capacitor has an adjusting shaft 120 passing through an opening 122 in the neck portion 90 in the housing part $76b$. The shaft 120 extends to the outside of the housing 76 where it may be rotated by a suitable tool or by hand. The housing part $76b$ also contains a plug-in unit 123 which comprises the pulse generator 8 and the sensitive circuit components constituting the various aforementioned charge and discharge circuits 14, 16, 18 and 20 all embedded in a body of plastic material forming a hermetically sealed unit. The components which are so embedded are enclosed by a dotted line 123 in FIG. 4. The plug-in unit has prongs 125 received in the terminal sockets of a connector unit 127 supported upon the aforementioned bracket 116. The bracket 116 of the housing part $76b$ also carries a relay 127 the purpose of which will be described later on, and a standard or test capacitor $Ct$ of adjustable value having a slotted shaft 119 permitting adjustment of its value.

A female connector unit 129 is provided to receive the male end of a connector 129' secured at the end of the cable 78. The cable 78 passes through the conduit 98 and the cable-receiving sleeve 94 to make connection with the socket terminals of the connector 129. Conductors (not shown) interconnect the female terminals of the connector 129 with the balancing capacitor $Cb$, test capacitor $Ct$, relay 127, and the plug-in unit 123.

In addition to the meter movement 6 and range changing resistance 40, the meter and control unit housing 81 contains a direct current power supply for operating the pulse generator 8, and some other circuit elements to be described.

The electrical circuits contained within the capacitor probe head unit 74 and the meter and control unit 79 are respectively shown in FIGS. 4 and 5 to which reference should now be made. Those circuit components shown in FIGS. 4 and 5 which are also present in FIG. 1 are indicated by the same reference numerals. The power supply 132 (FIG. 5) may be a conventional one operating from a 60 cycle, 117 volt commercial power source. A power cord 133 having power conductors 134 and 136 extends from the housing 81. The conductor 134 connects with an on-off power switch 138 having a control arm 139 on the outside of the meter housing 81 (FIG. 2). The switch 138, in turn, is connected to one end of the primary winding 140 of a conventional power transformer 142.

The power conductor 136 connects with the other end of the primary winding 140. The power transformer has a center tapped secondary winding 144 whose ends are respectively connected to similarly arranged rectifiers 146 and 148 which form with the secondary winding 144 a full wave rectifier circuit providing positive voltage pulsations. The terminals of the rectifiers 146 and 148 remote from the secondary winding 144 are connected together at 149. A conductor 152 extends from the center tap of the secondary winding 144 to an incandescent lamp 154 mounted on or visible from the outside of the housing 81 (FIG. 2). The side of the lamp 154 remote from the secondary winding 144 is connected to ground. Energization of lamp 154 indicates that power is being fed to the power supply.

A common conductor 155 extends from the common terminals of the rectifiers 146 and 148 to a filter network 156. The filter network as shown comprises a pair of filter capacitors 158—159, one of which is connected between the common conductor 155 and ground and the other of which is connected between an output conductor 160 and ground. A resistor 161 is connected between the ungrounded ends of capacitors 158 and 159. A Zener diode 161' is connected across the output of filter network 156 to regulate the voltage output of the power supply and to lower the effective impedance thereof. The regulated and filtered direct current voltage produced by the power supply is coupled by output conductor 160 to a terminal 162 of a cable receiving connector 163 mounted on or accessible from the outside of the housing 81. A grounded conductor 164 is provided which terminates at a terminal 166 of the connector 163. A relay control conductor 168 extends between the common conductor 155 to a normally-open test pushbutton switch 170 on the outside of the housing 81 (FIG. 2). The switch 170 is connected to a terminal 172 of connector 163. The connector terminals 162, 166 and 172 make connection with corresponding terminals 162', 166' and 172' of a connector 173 on the end of cable 78. The connectors 173 and 163 may be complementary plug and socket connectors well known in the art.

The cable connector terminals 162' and 166' which respectively represent the hot or positive and the grounded terminals of the power supply 132 extend respectively through cable conductors 174 and 176 to the male connector 129' on the end of cable 78 which plugs into the female connector 129 in the housing part 76b.

As previously indicated, the pulse generator 8 (FIG. 4) is preferably a transistor circuit. To this end, the pulse generator 8 most advantageously comprises a pair of PNP transistors 178 and 180. The transistor 178 has an emitter electrode 178a connected through resistor 179 to positive conductor 174' which is connected to the aforesaid hot cable conductor 174 through terminals of connectors 129—129'. The transistor 178 has a collector electrode 178b which is connected through a load resistor 182 to ground conductor 176' which is connected to the aforesaid grounded cable conductor 176 through connectors 129—129'. The latter transistor has a base electrode 178c connected through parallel connected choke 184 and resistor 185 and a conductor 185' to the juncture of a pair of resistors 186 and 188. The remote terminal of resistor 188 is connected to the positive conductor 174' and the remote terminal of resistor 186 is connected to the base electrode 180c of the transistor 180.

The transistor 180 has an emitter electrode 180a connected through parallel connected resistor 190 and capacitor 192 to the emitter electrode 178a of transistor 178. The transistor 180 has a collector electrode 180b connected through a choke 194 and a resistor 196 to the ground conductor 176'. A feed-back capacitor 198 is connected between the collector electrode 180b of transistor 180 and the base electrode 178c of the transistor 178.

A resistor 186' is connected between the base electrode 180c of transistor 180 and ground conductor 176', and a resistor 187 is connected between the base electrode 180c and the positive conductor 174'. The resistor 186' is shunted by a bypass capacitor 189 and resistor 187 is shunted by a bypass capacitor 191. A bypass capacitor 193 is connected between the positive and ground conductors 174' and 176'.

The transistors 178 and 180 are used as on-off switches having either highly conductive states or a relatively non-conductive state. The transistor 178 is an output transistor which is in a relatively non-conductive state when the capacitances $Cx$ and $Cb$ are to be discharged and is in a highly conductive state when these capacitances are to be charged. The transistor 180 conducts when the transistor 178 is non-conductive and is non-conductive when the transistor 178 conducts (considering steady state conditions of the circuit). The potential at the lower terminal of the load resistor 182 is a positive potential (for example, approximately 10 volts) when the transistor 178 is conducting and is substantially at ground potential when the transistor 178 is non-conductive. The capacitor 198 and the choke 184 together form a timing network which determines the time transistor 178 is non-conductive. The resistor 190 and the capacitor 192 associate with the emitter electrode 180a of transistor 180 determines the time during which the transistor 180 is non-conductive. The resistor 190 additionally acts to provide direct current degeneration for transistor 180 so that temperature variations of the transistor 180 are minimized. The resistor 179 associated with the emitter electrodes of both transistors 178 and 180 provides for emitter degeneration for temperature stabilization and additionally develops positive feedback for the pulse generator circuit.

The choke 194 connected to the collector electrode 180b of transistor 180 provides a rapidly rising voltage waveform so that the transistor 178 is switched as rapidly as possible. Resistors 186' and 187 connected to the base electrode 180c of transistor 180 form a bias network of low direct current impedance to provide temperature compensation for transistor 180. The associated resistors 186 and 188 provide a low impedance bias network for the base electrode 178c of transistor 178. They also provide a high enough alternating current impedance so that oscillations will start when power is initially turned on. Resistor 185 connected in parallel with the choke 184 acts as a damping resistor to prevent spurious oscillations.

The capacitors 189 and 191 bypass signal currents from the base 180c of transistor 180. They also bypass low radio frequency currents which may be induced in the power supply conductors 174 and 176. Capacitor 193 serves a similar purpose for high radio frequency currents which may be induced into the latter conductors.

The transistor circuit just described is one providing square wave output at an output terminal 199 connected to the collector electrode 178b of transistor 178. This output most advantageously is of a very high frequency, for example, one megacycle or higher. The higher the frequency of the pulse generator the more sensitive will be the measuring circuit. The particular frequency desired, of course, depends somewhat upon the cost and sensitivity requirements involved. The sensitivity S (and voltage output) of the capacitance measuring circuit is illustrated by the following relationship where F is the frequency and V is the voltage output of the transistor circuit, and C is the capacitance involved: $S=KCVF$ ($K$=constant).

The aforesaid test relay 127 is located within the capacitance probe head housing 76 and is electrically connected between the grounded conductor 176' and conductor 160' respectively connected with cable conductors 176 and 160 through connectors 129—129. As previously indicated, cable conductor 160 is connected through connector terminal 172, normally-open pushbutton switch 170 and conductor 168 to the positive voltage input to the power supply filter network 156. Accordingly, when the pushbutton switch 170 is closed, test relay 127 will be energized. The latter relay has a movable contact 127-1 which contacts a stationary contact 127-2 when the relay 127 is de-energized and stationary contact 127-3 when the relay is energized. The terminal of the capacity probe 77 constituted by the rod 108 is connected to the stationary contact 127-2 so that, normally, the capacitance of the probe is connected into the measuring circuit. The test capacitor $Ct$ is connected between the contact 127-3 and ground 176' so that the test capacitor $Ct$ is substituted for the probe whenever the relay 127 is energized. Capacity $Ct$ would have a fixed predetermined value for calibration purposes if the circuit were to be used as a capacitance measuring means with readings to be directly in capacitance units. However, when it is used as a liquid level measuring means, $Ct$ is most advantageously an adjustable capacitor which is adjusted to provide full scale deflection on the meter 6. The operator inserts the capacitor $Ct$ in the circuit to see if full scale deflection of the meter pointer results to test for the proper operation of the circuit.

The output terminal 199 of the pulse generator circuit 8 is connected by the conductor 22 to the charge rectifier 26 associated with the capacitor charge circuit 14 including the unknown capacitance $Cx$ and also to the rectifier 62 in the discharge circuit 20 associated with the balancing capacitor $Cb$. When the transistor 178 is conducting, the 10 volts applied to the conductor 22 is operative to charge the probe capacitance $Cx$ to about 10 volts through the rectifier 26.

When the transistor 178 is non-conductive, ground potential is present on the conductor 22 which effects the discharging of $Cx$ and $Cs$ through the discharge circuit 16 which includes the rectifier 36 connected to the choke 200. The choke 200 together with a bypass capacitor 204 filter out alternating current components from the cable 78. The bypass capacitor 204 is connected between the juncture of choke 200 and rectifier 36 and the conductor 22 and constitutes that portion of the discharge circuit which handles the varying or alternating components of the discharge current involved. Choke 200 and the capacitor 204 thus respectively isolate the distributed capacity of the cable 78 from that portion of the measuring circuit which determines the capacitance measurement. So, for all practical purposes, changes in cable length do not affect the accuracy of the circuit and the cable length does not place any significant limitations thereon. The choke 200 is connected by a conductor 38' to a terminal of the female conductor 129 connected to cable conductor 38 of cable 78. An isolating choke 212 is connected between a return line 41' from the meter circuit to be described and the common conductor 22. The line 41' leads to a terminal of the female conductor 129 in turn connected to a conductor 41 of the cable 78. The choke 212 serves a purpose similar to that of choke 200.

Cable conductors 38 and 41 are connected through connectors 173 and 163 (FIG. 5) to respective conductors 38" and 41" in the meter and control unit housing 81. Filter capacitors 52 and 52' are respectively connected between conductors 38" and 41" and ground. The latter conductors are connected to a meter circuit which is somewhat different from that shown in FIG. 1. This meter circuit includes the sensitive direct current meter movement 6 which, in the exemplary circuit now being described, may be a sensitive 50 micro-amp meter movement, a pair of ganged switches 213 and 215 respectively having movable contacts 213a and 215a which are selectively engageable with three stationary contacts 213b-1, b-2, and b-3, and 215b-1, b-2, and b-3. A resistor 40a is connected between stationary contacts 213b-1 and 213b-2 and resistors 40b-1 and 40b-2 are respectively connected between stationary contacts 215b-1 and b-2 and 215b-2 and b-3. The end of the resistor 40a connected to the stationary contact 213b-1 is connected to the conductor 38" and the associated movable contact 213a is connected to the conductor 41". The upper stationary terminal 215b-1 of the switch 215 is coupled through a variable rheostat or the like 219 controlled by a knob 220 (FIG. 2) on the front of the housing 81. The ganged movable contacts 213a and 215a are controlled by the range change control knob 221 (FIG. 2) on the front of the housing 81.

When the movable contact 213a is on the uppermost stationary contact 213b-1 as shown in FIG. 5, the meter movement 6 is shorted out of the circuit to protect the meter against damage when the meter is not in use. When the movable contacts 213a and 215a engage the lowermost contacts 213b-3 and 215b-3, a maximum impedance is connected in shunt with the meter movement which provides maximum sensitivity of the meter movement. The intermediate position of the movable contacts 213a and 215a provides the high capacitance range where the system has a lesser sensitivity.

In using liquid level measuring apparatus shown in FIGS. 2-5, after the power has been turned on and the equipment warmed up, the control shaft 120 for the balancing capacitor $Cb$ is varied to provide a zero reading of the pointer 6' on the scale 6a of the meter movement with the liquid at its lowest point. As previously explained, this zero adjustment balances out static capacitance. Next, the fluid to be used is permitted to rise in capacitance probe 77, shown in FIG. 2, to the desired full level. Range switch 221 is adjusted to keep the meter indication of meter 6 to just more than full scale reading. Control knob 220 which operates potentiometer 219 is now retarded to give an exact full scale reading of meter pointer 6' on meter 6 with full immersion of probe 77. Now pushbutton 170 is depressed to energize the test relay 127 which, as above explained, inserts the capacitor $Ct$ into the measuring circuit in place of the capacitance probe 77. The capacitance of $Ct$ is then adjusted by removing cover 76a and turning shaft 119 so that pointer 6' of the meter movement 6, again, reads full scale. Cover 76a is now restored and the circuit can then be tested for proper operation merely by depressing pushbutton 170 and observing full scale deflection of meter pointer 6'.

The measuring apparatus is then ready to measure the level of the liquid involved where small capacity changes are clearly indicated on the linear scale 6a of the meter movement. The variable ranges are made available for use with different liquids which may have different dielectric constants which provide different ranges of capacity.

As previously indicated, the length of the cable 78 connected between the capacitance probe head housing 76 and the meter and control unit housing 81 will have no significant effect on the meter reading since the stray capacitance of the cable is isolated from the portions of the charge and discharge circuits of the measuring circuit carrying non-direct current components which determine the values of the direct current voltage to which the direct current meter movement responds.

As previously indicated, the plastic embedded components in the plug-in unit 123 forming the various parts of pulse generator 8 and the aforesaid charge and discharge circuits provide a circuit which is not liable to be affected by humidity changes. The measuring circuit is in other respects also a rugged and reliable one.

The capacitance measuring circuit of the present invention is an exceedingly sensitive linear and accurate means for measuring very small capacitance values and particularly small changes in capacitance in the presence of a large static capacitance. In addition to its use as a straight capacitance measuring circuit and as a liquid level indicator, the characteristics of the present invention make it very useful in wide variety of applications, such as amplification of piezoelectric changes in piezoelectric transducers through capacitance variations thereof, and the measurements of dielectric constants of solids, gases, liquids and mixtures thereof, or measurements of various qualities of gaseous, liquid or solid materials dependent on variations of their dielectric constants, such as relative humidity, measurement of moisture content in solids, and other measurements of the relative proportions of two materials having different dielectric constants.

It should be understood that numerous modifications may be made in the form of the invention above described without deviating from the broader aspects of the invention.

What I claim as new and desire to protect by Letters Patent of the United States is:

1. Capacitance measuring apparatus comprising: a direct current meter for indicating the value of the capacitance to be measured, a pulse generator providing a continuous train of similar pulses of a given polarity, a first capacitor charge circuit coupled to said pulse generator to receive said pulses therefrom, said capacitor charge circuit including the capacitor to be measured, a second capacitor charge circuit coupled to said pulse generator to receive said pulses therefrom, said second capacitor charge circuit including a second capacitor, first and second capacitor discharge circuits for respectively discharging the capacitors of said first and second capacitor charge circuits in the interim between successive pulses of said continuous train of pulses, the charge circuit for the capacitor to be measured and said second capacitor and the discharge circuit for the capacitor to be measured and said second capacitor having a common portion where currents from the charge and discharge circuits involved flow in opposite directions, said direct current meter being connected in said common circuit portion to register the difference in the currents flowing in the latter charge and discharge circuits, and current flow varying means for varying the current flow of the circuit associated with said second capacitor which supplies current to said common circuit portion to balance out the current flowing therethrough from the static capacitance.

2. Capacitance measuring apparatus comprising: a direct current meter for indicating the value of the capacitance to be measured, a pulse generator providing a continuous train of similar pulses of a given polarity, a first capacitor charge circuit coupled to said pulse generator to receive said pulses therefrom, said capacitor charge circuit including the capacitor to be measured and having a time constant which effects substantially the full charging of the largest capacitor to be measured within the duration of one of said pulses, a second capacitor charge circuit coupled to said pulse generator to receive said pulses therefrom, said second capacitor charge circuit including a second capacitor, the time constant of said second capacitor charge circuit effecting substantially the full charging of the latter capacitor within the duration of one of said pulses, first and second capacitor discharge circuits for respectively substantially fully discharging the capacitors of said first and second capacitor charge circuits in the interim between successive pulses of said continuous train of pulses, the charge circuit for one of the capacitor to be measured and said second capacitor and the discharge circuit of the other of same having a common portion where currents from the charge and discharge circuits involved flow in opposite directions, said direct current meter being connected in said common circuit portion to register the difference in the currents flowing in the latter charge and discharge circuits, and current varying means for varying the current flow in the circuit associated with said second capacitor which supplies current to said common circuit portion to balance out the current flowing therethrough from the static capacitance.

3. Capacitance measuring apparatus comprising: a direct current-responsive meter for indicating the value of the capacitance to be measured, a pulse generator providing a continuous train of similar voltage pulses of a given polarity, first and second capacitor charge circuits connected in parallel with the output of said pulse generator, said first capacitor charge circuit including capacitor terminal means for connecting the capacitance to be measured into the charge circuit, said second capacitor charge circuit having a capacitor therein and being designed substantially to fully charge the latter capacitor within the duration of one of said pulses, first and second capacitor discharge paths for discharging the capacitances in said first and second charge circuits in the interim between successive ones of said pulses, said first discharge path and said second charge path including a common path portion through which the currents flowing in said paths pass in opposite directions, said direct current responsive meter being connected in said common path portion to register the difference in the currents flowing in said common path portion, and said second charge path including means for adjusting the current flow therein to provide a charge current which balances out the discharge current from any static capacitance in the first discharge path, the current flow in said meter being proportional to the amount of capacitance in said first discharge path which is in excess of the static capacitance therein.

4. Capacitance measuring apparatus comprising: a direct current meter for indicating the value of the capacitance to be measured, a pulse generator providing a continuous train of similar pulses of a given polarity, a measuring circuit comprising: a capacitor charge circuit coupled to said pulse generator to receive said pulses therefrom, the capacitor charge circuit including terminal means for connecting the capacitor to be measured into the charge circuit, said capacitor charge circuit having a time constant which effects substantially the full charging of the largest capacitor to be measured within the duration of each of said pulses, and a capacitor discharge circuit having a time constant which effects substantially the full discharging of said capacitor in said measuring circuit in the interim between the generation of successive ones of said pulses, a balancing circuit comprising: a second capacitor charge circuit coupled to said pulse generator to receive said pulses therefrom and including a capacitor to be charged, said second capacitor charge circuit having a time constant which effects substantially the full charging of the capacitor therein within the duration of each of said pulses, and a second capacitor discharge circuit for the capacitor in said second charge circuit which effects substantially the full discharging of the latter capacitor in the interim between successive ones of said pulses, and said direct current meter being differentially connected to the charge circuit of one of said measuring and balancing circuits and the discharge circuit of the other of same to receive current flowing in opposite directions respectively from said measuring and balancing circuits, to provide a resultant indication indicating the excess of the capacitance to be measured over the static capacitance in the measuring circuit, said balancing circuit including current flow varying means for adjusting the reading of said meter to zero when the capacitance of said measuring circuit represents only said static capacitance.

5. Capacitance measuring apparatus comprising: a direct current meter for indicating the value of the capacitance to be measured, a pulse generator circuit providing a continuous train of similar pulses of a given polarity and including rectifier means for blocking current flowing in a direction opposite to the current resulting from said pulses, a measuring circuit comprising: a capacitor charge circuit coupled to said pulse generator to receive said pulses therefrom, the capacitor charge circuit including terminal means for connecting the capacitor to be measured into the charge circuit, and a capacitor discharge circuit which effects discharging of said capacitor in said measuring circuit in the interim between the generation of successive ones of said pulses and including rectifier means for blocking current flow in a direction opposite to the flow of the discharge current from the latter capacitor, a balancing circuit comprising: a second capacitor charge circuit coupled to said pulse generator to receive said pulses therefrom and including rectifier means for blocking current flowing in a direction opposite to the current resulting from said pulses and a capacitor to be charged, and a second capacitor discharge circuit for the capacitance in said second charge circuit which effects the discharging of the latter capacitor in the interim between successive ones of said pulses and including rectifier means for blocking current flow in a direction opposite to the flow of the discharge current from the latter capacitor, and said direct current meter being differentially connected to the charge circuit of one of said measuring and balancing circuits and the discharge circuit of the other of same to receive current flowing in opposite directions respectively from said measuring and balancing circuits, to provide a resultant indication indicating the excess of the capacitance to be measured over the static capacitance in the measuring circuit, said balancing circuit including current flow varying means for adjusting the reading of said meter to zero when the capacitance of said measuring circuit represents only said static capacitance.

6. Capacitance measuring apparatus comprising: a direct current meter for indicating the value of the capacitance to be measured; a pulse generator providing a continuous train of pulses of at least one given polarity, a measuring circuit comprising a capacitor charge circuit coupled to said pulse generator to receive said pulses therefrom and including rectifier means for blocking current flowing in a direction opposite to the current resulting from said pulses, the capacitor charge circuit including terminal means for connecting the capacitor to be measured into the charge circuit, and a capacitor discharge circuit having a time constant which effects the discharging of said capacitor in said measuring circuit in the interim between the generation of successive ones of said pulses and including rectifier means for blocking current flow in a direction opposite to the flow of the discharge current from the latter capacitor, a balancing circuit comprising a second capacitor charge circuit coupled to said pulse generator to receive said pulses therefrom and including rectifier means for blocking current flowing in a direction opposite to current resulting from said pulses and a variable balancing capacitor to be charged, and a second capacitor discharge circuit for the capacitor in said second charge circuit which effects the discharging of said balancing capacitor in the interim between successive ones of said pulses and including rectifier means for blocking current flow in a direction opposite to the flow of the discharge current from the latter capacitor, and said direct current meter being differentially connected to the charge circuit of one of said measuring and balancing circuits and the discharge circuit of the other of same to receive current flowing in opposite directions respectively from said measuring and balancing circuits, to provide a resultant indication indicating the excess of the capacitance to be measured over the static capacitance in the measuring circuit, said variable balancing capacitor of said balancing circuit being effective for adjusting the reading of said meter to zero when the capacitance of said measuring circuit represents only said static capacitance.

7. Capacitance measuring apparatus comprising: a measuring station including capacitor connecting terminal means to which the capacitance to be measured is connected, a pulse generator circuit operative when connected to a source of direct current voltage to provide a continuous train of voltage pulses of a given polarity, and a balancing circuit capacitor; a cable extending from said pulse generator circuit to a monitoring station and including a number of independent conductors; said monitoring station including a source of direct current for operating said pulse generator, at least one of said conductors connecting said source of direct current with said pulse generator circuit to operate the same, a direct current meter for indicating the value of the capacitance to be measured; circuit connecting means at said measuring and monitoring stations interconnecting the other cable conductors, capacitor connecting terminal means, pulse generator circuit, balancing circuit capacitor, and meter to form first and second capacitor charge circuits respectively for the capacitance to be measured and said balancing circuit capacitor wherein said pulses from said pulse generator circuit charge said capacitance; and first and second capacitor discharge circuits respectively for said charge circuits which discharge the same in the interim between successive ones of said pulses, said meter being connected to the charge circuit of said capacitance to be measured and balancing circuit capacitor and the discharge circuit of the other of same to receive in opposite directions the average currents flowing therefrom, and means in the portion of the circuit of said balancing circuit capacitor which feeds current to said meter for varying the current flow of the associated circuit to balance out the current flowing through said meter from the static capacitance in the circuit associated with the capacitance to be measured.

8. Capacitance measuring apparatus comprising: a measuring station including capacitor connecting terminal means to which the capacitance to be measured is connected, a pulse generator circuit operative when connected to a source of direct current voltage to provide a continuous train of voltage pulses of a given polarity, and a balancing circuit capacitor, a cable extending from said pulse generator circuit to a monitoring station and including a number of independent conductors; said monitoring station including a source of direct current for operating said pulse generator, at least one of said conductors connecting said source of direct current with said pulse generator circuit to operate the same, a direct current meter for indicating the value of the capacitance to be measured, circuit connecting means at said measuring and monitoring stations interconnecting the other cable conductors, capacitor connecting terminal means, pulse generator circuit, balancing circuit capacitor, and meter to form first and second capacitor charge circuits respectively for the capacitance to be measured and said balancing circuit capacitor wherein said pulses from said pulse generator circuit fully charge said capacitance within the duration of one of said pulses; and first and second capacitor discharge circuits respectively for said charge circuits which substantially fully discharge the same in the interim between successive ones of said pulses, said meter being connected to the charge circuit of said capacitance to be measured and balancing circuit capacitor and the discharge circuit of the other of same to receive in opposite directions the average currents flowing therefrom, and means in the portion of the circuit of said balancing circuit capacitor which feeds current to said meter for varying the current flow in the associated circuit to balance out the current flowing through said meter from the static capacitance in the circuit associated with the capacitance to be measured.

9. Capacitance measuring apparatus comprising: a measuring station including capacitor connecting terminal means to which the capacitance to be measured is connected, a pulse generator circuit operative when connected to a source of direct current voltage to provide a continuous train of voltage pulses of a given polarity, a balancing circuit capacitor, and a test capacitor; a cable extending from said pulse generator circuit to a monitoring station and including a number of independent conductors; said monitoring station including a source of direct current for operating said pulse generator, at least one of said conductors connecting said source of direct current with said pulse generator circuit to operate the same, a direct current meter for indicating the value of the capacitance to be measured; circuit connecting means at said measuring and monitoring stations interconnecting the other cable conductors, capacitor connecting terminal means, pulse generator circuit, balancing circuit capacitor, and meter to form first and second capacitor charge circuits respectively for the capacitance to be measured and said balancing circuit capacitor wherein said pulses from said pulse generator circuit fully charge said capacitance within the duration of one of said pulses; and first and second capacitor discharge circuits respectively for said charge circuits which substantially fully discharge the same in the interim between successive ones of said pulses, said meter being connected to the charge circuit of said capacitance to be measured and balancing circuit capacitor and the discharge circuit of the other of same to receive in opposite directions the average currents flowing therefrom, means in the portion of the circuit of said balancing circuit capacitor which feeds current to said meter for varying the current flow of the associated circuit to balance out the current flowing through said meter from the static capacitance in the circuit associated with the capacitance to be measured, and manually operable switching means at said remote point for substituting said test capacitor for said capacitance probe for testing the measuring apparatus.

10. Liquid level measuring apparatus comprising: a capacitance probe whose capacitance is a function of the length of the probe submerged in the liquid whose level is to be measured, a pulse generator circuit operative when connected to a source of direct current voltage to provide a continuous train of voltage pulses of a given polarity, a cable extending from said probe to a remote point and including a number of independent conductors, a source of direct current at said remote point for operating said pulse generator, at least one of said conductors connecting said source of direct current with said pulse generator circuit to operate the same, a balancing circuit capacitor, a direct current meter at said remote point for indicating the level of the liquid involved, circuit connecting means interconnecting the cable conductors, the pulse generator circuit, balancing circuit capacitor, and meter to form first and second capacitor charge circuits respectively for said capacitance probe and said balancing circuit capacitor wherein said pulses from said pulse generator circuit charge said probe capacitance and said balancing circuit capacitor, and first and second capacitor discharge circuits respectively for said charge circuits which discharge the same in the interim between successive ones of said pulses, said meter being connected to the charge circuit of one of said capacitance probe and balancing circuit capacitor and the discharge circuit of the other of same to receive in opposite directions currents therefrom, and means in the portion of the circuit of said balancing circuit capacitor which feeds current to said meter for varying the current flow therein to provide a current which balances out the current flowing through said meter from the circuit associated with the probe capacitance when the liquid level involved is at a minimum.

11. Liquid level measuring apparatus comprising: a capacitance probe whose capacitance is a function of the length of the probe submerged in the liquid whose level is to be measured, a pulse generator circuit operative when connected to a source of direct current voltage to provide a continuous train of voltage pulses of a given polarity, a cable extending from said probe to a remote point and including a number of independent conductors, a source of direct current at said remote point for operating said pulse generator, at least one of said conductors connecting said source of direct current with said pulse generator circuit to operate the same, a balancing circuit capacitor, a direct current meter at said remote point for indicating the level of the liquid involved, circuit connecting means interconnecting the cable conductors, the pulse generator circuit, balancing circuit capacitor, and meter to form first and second capacitor charge circuits respectively for said capacitance probe and said balancing circuit capacitor wherein said pulses from said pulse generator circuit fully charge said probe capacitance and said balancing circuit capacitor within the duration of one of said pulses, and first and second capacitor discharge circuits respectively for said charge circuits which substantially fully discharge the same in the interim between successive ones of said pulses, said meter being connected to the charge circuit of one of said capacitance probe and balancing circuit capacitor and the discharge circuit of the other of same to receive in opposite directions currents therefrom, means in the portion of the circuit of said balancing circuit capacitor which feeds current to said meter for varying the current flow thereof to provide a current which balances out the current flowing through said meter from the circuit associated with the probe capacitance when the liquid level involved is at a minimum.

12. Liquid level measuring apparatus comprising: a capacitance probe whose capacitance is a function of the length of the probe submerged in the liquid whose level is to be measured, a pulse generator circuit operative when connected to a source of direct current voltage to provide a continuous train of voltage pulses of a given polarity, a cable extending from said probe to a remote point and including a number of independent conductors, a source of direct current at said remote point for operating said pulse generator, at least one of said conductors connecting said source of direct current with said pulse generator circuit to operate the same, a balancing circuit capacitor, a direct current meter at said remote point for indicating the level of the liquid involved, manually variable range changing impedance means at said remote point for varying the sensitivity of the liquid level measuring apparatus in discrete predetermined steps, circuit connecting means interconnecting the cable conductors, the pulse generator circuit, balancing circuit capacitor, range changing impedance means and meter to form first and second capacitor charge circuits respectively for said capacitance probe and said balancing circuit capacitor wherein said pulses from said pulse generator circuit fully charge said probe capacitance and said balancing circuit capacitor within the duration of one of said pulses, and first and second capacitor discharge circuits respectively for said charge circuits which substantially fully discharge the same in the interim between successive ones of said pulses, said meter being connected to the charge circuit of one of said capacitance probe and balancing circuit capacitor and the discharge circuit of the other of same to receive in opposite directions currents therefrom, means in the portion of the circuit of said balancing circuit capacitor which feeds current to said meter for varying the current flow thereof to provide a current which balances out the current flowing through said meter from the circuit associated with the probe capacitance when the liquid level involved is at a minimum, and said range changing impedance means being in the path of flow of the currents flowing in opposite directions through said cable and affecting the currents to the same degree so that the range changing and balancing adjustments are independent of one another.

13. Capacitance measuring appartus comprising: a direct current-responsive meter for indicating the value of the capacitance to be measured, a pulse generator providing a continuous train of similar pulses of a given polarity and including impedance means providing a path for flow of direct current and having first and second output terminals across which said pulses appear, a first capacitor charge circuit connected across said impedance means and including in series circuit relation a first capacitor and a rectifier for limiting current flow therein to charge current, a first discharge circuit for said first capacitor and including in series circuit relation between said capacitor terminal means and first output terminal means of said impedance means a rectifier limiting current flow to discharge current and said direct current-responsive meter, a second capacitor charge circuit connected across an output terminal means of said impedance means and including in series circuit relation a second capacitor, a rectifier limiting current flow to charge current, and said direct current-responsive meter, said first discharge circuit and said second charge circuit having a common path portion including said direct current-responsive meter and through which the charge and discharge currents involved flow in opposite directions, a second capacitor discharge circuit for said second charge circuit connected between said second capacitor and said first output terminal means of said impedance means and including a rectifier for limiting current flow to discharge current, one of said capacitors being the capacitor to be measured and the circuit associated with said other capacitor which includes said direct-current responsive meter including current flow varying means for varying the current flow therein to provide current flow therein which balances out the current flow through the direct-current-responsive meter flowing in the opposite direction from the circuit including said capacitor to be measured, the time constants of said first and second capacitors charge circuits being such that said first and second capacitors fully charge within the duration of any one of said pulses, and the time constants of said first and second capacitors discharge circuits being such that said associated capacitors substantially fully discharge in the interval between successive ones of said pulses.

References Cited in the file of this patent

UNITED STATES PATENTS

| | | |
|---|---|---|
| 2,375,084 | Coroniti et al. | May 1, 1945 |
| 2,666,898 | Harris | Jan. 19, 1954 |
| 2,766,428 | Sippach | Oct. 9, 1956 |
| 2,777,989 | Adams | Jan. 15, 1957 |
| 2,820,194 | Reinartz | Jan. 14, 1958 |
| 2,901,695 | Wied | Aug. 25, 1959 |
| 2,940,037 | Lide | June 7, 1960 |

OTHER REFERENCES

New Bridge Technique, by Thomas Roddam in "Wireless World," January 1950, pages 8–10.